July 7, 1964
A. J. NERAD ETAL
3,139,724
DUAL FUEL COMBUSTION SYSTEM
Filed Dec. 29, 1958
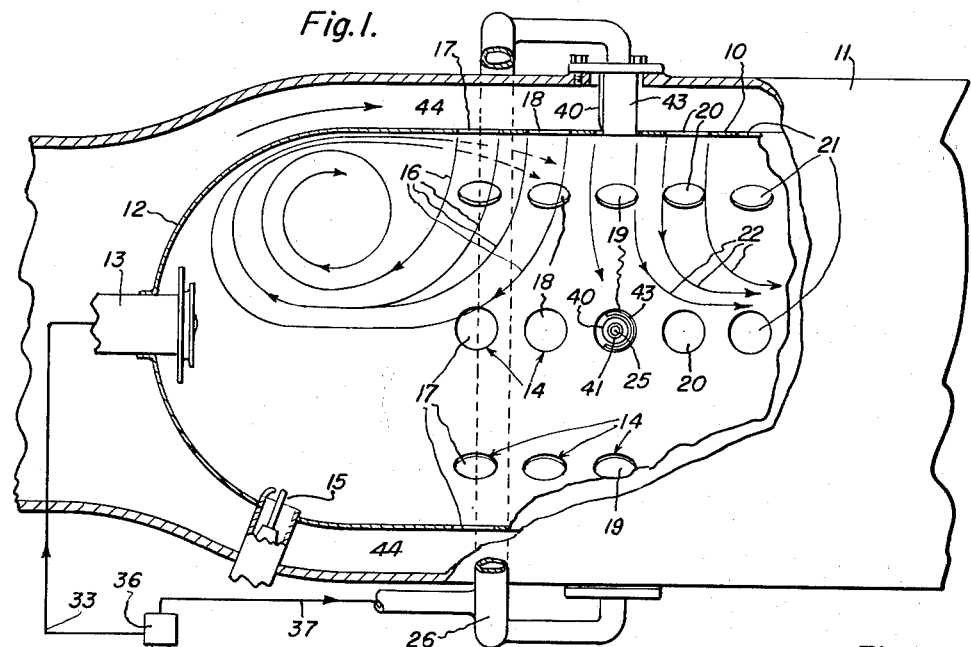
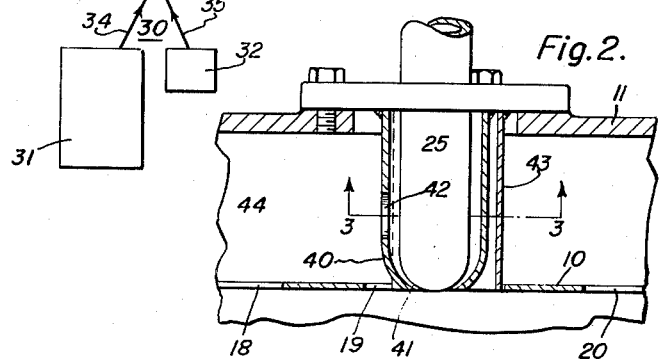
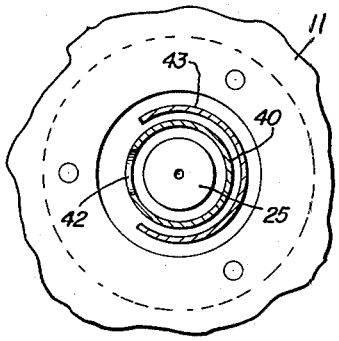
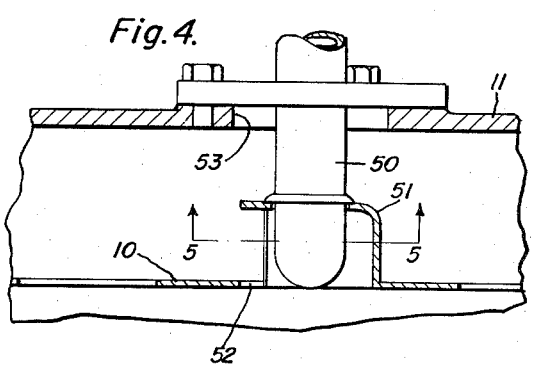
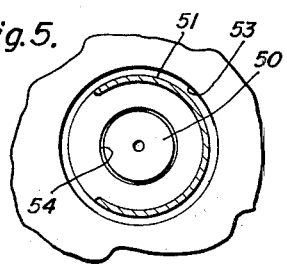
Inventors:
Anthony J. Nerad;
Zachary D. Sheldon,
by Joseph T. Cohen
Their Attorney.

United States Patent Office 3,139,724
Patented July 7, 1964

3,139,724
DUAL FUEL COMBUSTION SYSTEM
Anthony J. Nerad, Alplaus, and Zachary D. Sheldon, Schenectady, N.Y., assignors to General Electric Company, a corporation of New York
Filed Dec. 29, 1958, Ser. No. 783,599
8 Claims. (Cl. 60—35.4)

This invention relates to a fuel system and more particularly to a combined interconnected fuel system whereby various combinations of low and high energy fuels may be utilized to operate a suitable power plant at various levels of energy output.

This invention is readily adaptable for use with conventional gas turbine power plants and related jet apparatus. Such power plants are generally limited, in one respect, to the particular fuel being utilized, based upon the heat value or B.t.u. available per pound of the fuel in a particular engine. The need of higher performance engines has led to various methods of increasing power output of these engines. These methods generally include introducing additives into present fuels, or, by short term injections of water or water alcohol and the like mixtures, processes generally referred to as "reheat operation" or "thrust augmentation." Other means of temporarily increasing the energy output of these engines, particularly in aircraft engines, may take the form of JATO units, which may be described as attaching small rockets to an aircraft in order to obtain a greater thrust, preferably during take-off conditions.

Present jet engines generally use a hydrocarbon fuel which is a mixture of kerosene and gasoline. For example, the more common jet fuel, military designation JP4, generally comprises about 35 parts kerosene to 65 parts aviation reciprocating engine gasoline. This fuel has a B.t.u. content of approximately 20,000 B.t.u. per pound and is a limiting factor in aircraft performance.

It may be seen, therefore, that a particularly desirable method of increasing the performance of jet engines would be to employ a fuel having a higher available B.t.u. content where the content may be utilized effectively, and more importantly, employing an interconnected fuel system controlling both the higher energy fuel for particular operating conditions and the low energy fuel for remaining conditions. This is an advantageous arrangement considering the present high rate of fuel consumption in the above-mentioned power plants and the ever-present economic and weight factor which become quite deterrent to the use of a high energy fuel.

Examples of high energy fuels, as referred to in this invention, are those fuels containing compounds of boron and hydrogen, referred to as the borohydrides, for example, pentaborane $B_5H_9$, diborane $B_2H_6$ and decaborane $B_{10}H_{14}$. Other high energy fuels may contain carbon in addition to boron, for example, $(C_2H_5)_x(B_{10}H_{14})_y$ and $(C_3H_7)_x(B_5H_9)_y$ where $x$ and $y$ are variable. The borohydride or boron-containing fuels have about a 50 percent greater heat of combustion or approximately 30,000 B.t.u. per pound as compared to the aforementioned hydrocarbon fuels of about 20,000 B.t.u. per pound. A particular disadvantage in prior use of the boron-containing fuels is that the combustion process results in a very heavy $B_2O_3$ solid deposit throughout the combustion system which tends to shorten the life expectancy of related equipment, and in many instances, maintaining combustion is very difficult by reason of the solid deposits plugging the fuel nozzles and the air openings within minutes after combustion has been initiated. The previous use of boron-containing fuel as the sole fuel for a high performance aircraft engine forms such a concentration of solid deposits not only in the engine itself but also in the exhaust, and emitting as a large dust cloud to represent a personnel hazard during take-off of a number of planes from an airfield, aircraft carrier, etc.

Accordingly, it is an object of this invention to provide a fuel system for the combustion of boron-containing fuels.

It is another object of this invention to provide a combustion system utilizing either/or both a hydrocarbon fuel and a boron-containing fuel.

It is a further object of this invention to utilize boron-containing fuels in present turbojet engines.

It is yet another object of this invention to minimize solid deposits from the combustion of boron-containing fuel.

Another object of this invention is to provide increased engine flexibility by the use of a boron-containing fuel in a dual fuel system.

It is still another object of this invention to provide a fuel system adapted to the use of boron-containing fuel wherein the fuel is injected into a combustion system in a preferred location.

Briefly described in one form, this invention includes preserving the present combustion system design on turbojet engines and adding a separate high energy fuel system having an injector placed in a position in the combustor which provides utilizing the high energy fuel to the best advantage.

This invention will be better understood in connection with the following description and the appended drawing in which:

FIG. 1 is an illustration of a high energy fuel system incorporated in combination with a "present design" fuel system of a gas turbine engine.

FIG. 2 is an illustration of a preferred boron fuel nozzle in the fuel system of FIG. 1.

FIG. 3 is an end view of the nozzle of FIG. 2.

FIG. 4 is a modification of a boron fuel nozzle.

FIG. 5 is an end view of the nozzle of FIG. 4.

Referring now to FIG. 1, there is illustrated the well known type of tubular combustion chamber or combustor 10 with a surrounding coaxial casing 11. In the application of these combustors to jet aircraft, a series of such combustors are mounted in ring form to provide gases to a turbine wheel (not shown), or one such combustor in annular form may be utilized to provide the same result. The combustion chamber 10 is generally a tube with an arcuate end cap or dome 12 at the upstream end and an open downstream end, not shown. In the standard design, hydrocarbon fuel for the combustor 10 is provided by injection means such as a well known hydrocarbon fuel nozzle 13 mounted generally in the arcuate end cap or dome 12 and connected to a suitable source of fuel to be hereinafter described. Fuel nozzle 13 sprays fuel longitudinally into the combustion chamber 10 to be mixed with air entering through a series of rows 17, 18, 19, etc. of openings 14 along the walls thereof. Ignition of the fuel air mixture may be provided by means of a suitable ignition device, such as spark plug 15, or where a series of such combustors are employed, by means of the well known crossover tubes, not shown. Arrows 16 of FIG. 1 projecting through the openings 14 illustrate the air flow pattern into such a combustor, and, it is to be noted that the air entering the first rows 17 and 18 of openings 14 generally flows upstream of the combustor tube 10 to mix with fuel issuing from fuel nozzle 13.

At the same time, another portion of this air, as illustrated by arrows 22, enters the combustion tube 10 through remaining rows 19, 20, etc., of openings 14 downstream to flow downstream. A null plane or balance plane is formed between the two sets of arrows 16 and 22 and is referred to as that portion of the combustion chamber in which the air flow is considered stable and transition to the upstream and downstream flow is extremely less violent, i.e., the flow from this stable portion does not reach to the extremes of the end dome 12 and side walls of the combustion chamber.

When a boron-containing fuel is introduced into such a combustion chamber 10 through the standard nozzle 13, or in conjunction with the standard nozzle 13, the high heat of combustion together with the reverse flow characteristics as indicated by the upstream arrows 16, results in a very heavy deposit of $B_2O_3$ not only on the walls of the combustion chamber and the inlet to the turbine wheel, but also on the fuel nozzle itself with a resultant reduced efficiency, plugging, and erratic operation. Furthermore, due to the high heat release capacity of the boron-containing fuel, a considerable temperature is reached in the forward portion of the combustion chamber which receives less air than the downward portion of the combustion chamber. In keeping with the high heat release and quick burning characteristics of the boron-containing fuel, it has been discovered that combustion efficiency of boron fuel may be increased by introduction thereof into combustion chamber 10 at positions spaced downstream of end dome 12 nearer ideal or stoichiometric mixture ratio. Such positions have been spaced downstream to within ten inches of the end of combustion chamber 10 with complete burning and high heat release within the ten-inch distance. A preferred position of separate boron fuel nozzles or injection means for boron fuel is in the side wall of the combustor at a downstream position where reverse flow characteristics of the combustor are at a minimum. Specifically, it has been discovered that this position generally commences at null plane of the combustor and that the boron fuel nozzles should project inwardly adjacent the null plane to introduce fuel into the combustion chamber generally perpendicularly to the axial flow of fuel air mixture therein. One example of a preferred position is illustrated by the boron fuel nozzles 25 in FIG. 1. By this arrangement, the extreme temperature of high energy fuel during combustion is prevented from injuring the combustion liner, since at the downstream portion of the combustion liner, a greater amount of cooling air is admitted, and furthermore, little if any of the high energy fuel is caught up in the reverse flow to result in heavy deposits along the chamber walls and to plug the hydrocarbon fuel nozzle.

While the burner of FIG. 1 may be one of many well known forms of combustion chambers having reverse flow characteristics, in a preferred form of this invention, an exemplary combustor is one as described and claimed in U.S. Patent 2,601,000, issued to A. J. Nerad and assigned to the same assignee as the present invention. The disclosure of that U.S. patent is incorporated herewith and reference may be made thereto for the various structural details and design considerations of a combustion chamber. However, other types of combustors may also be employed in this invention by placing the high energy fuel nozzles at positions avoiding recirculating flow conditions, or conditions where a full supply of air for burning is not available. Jet combustors in general make use of various forms of recirculation to increase residence time, for better burning etc.

A preferred boron fuel nozzle position is adjacent the null plane of a Nerad burner in the downstream direction, and the nozzles are preferably mounted in pairs, for example, four nozzles with each nozzle being spaced circumferentially about the combustion chamber at 90° locations. This exemplary arrangement is also illustrated in FIG. 1.

Other variables which influence solid deposits in combustion chambers, are fuel nozzle configuration and ambient temperatures. Variances in nozzle design provide direct variances in solid deposits. In one form of this invention, the nozzle includes an air shroud in order that incoming air may be deflected to sweep across the nozzle face to aid in the prevention of clinker formations. Tests have indicated that an unshrouded or flush mounted nozzle becomes plugged within minutes after combustion is initiated. Also, shrouding of high energy fuel nozzles is desirable where temperatures in the vicinity of the fuel nozzle may be sufficiently high to cause pyrolysis of the fuel within the nozzle itself. One nozzle which may be suitably adapted to this invention is illustrated in U.S. Patent 2,582,268, issued to A. J. Nerad and assigned to the same assignee as the present invention. The nozzle illustrated in that patent comprises a series of concentric tubular ducts, the central tube being the fuel nozzle, the next adjacent tube being a coolant flow defining passage, and the outer concentric tube defining combustion air passage.

A preferred form of boron fuel nozzle is illustrated by FIGS. 2 and 3. In FIGS. 2 and 3, casing 11 and liner 10 receives a perpendicularly mounted or radially positioned nozzle 25. A concentric tube 40 surrounds nozzle 25 and defines a lower opening 41 and a side opening 42. A further trough-like tube section 43 is positioned about tube 40. By this arrangement, air flows from space 44 between the casing 11 and liner 10 and enters the openings 42 to flow about and cool nozzle 25. At the same time, air is deflected by the trough-like section 43 to be added to the air entering opening 42 and provide a combined air flow across the nozzle face.

FIGS. 4 and 5 illustrate a modified form of a boron fuel nozzle which provide good results in this invention and which remains substantially free from deleterious deposits over a wide range of operation conditions. In FIG. 4, a boron fuel nozzle 50 is positioned in casing 11 and the liner 10. A raised surface or deflecting lip 51 is stamped from or otherwise attached or provided with liner 10 and partly surrounds a nozzle opening 52. Nozzle 50 is positioned in an opening 53 in casing 11 and is attached to or projects therethrough to a suitable opening 54 or other engaging means in lip 51 to spray fuel into the liner 10. Air flowing between liner 10 and casing 11 is deflected by the lip 51 to sweep air across the nozzle face.

A preferred embodiment of this invention, as illustrated in FIG. 1, includes four boron fuel nozzles 25 arranged circumferentially of casing 11 at 90° intervals and obtaining fuel from a common manifold assembly 26. These boron fuel nozzles inject fuel approximately at the downstream side of the null plane of liner 10, the range of position extending from and including the null plane to a predetermined location downstream.

Various well known fuel systems and controls, therefore, may be employed in this invention. One form of fuel system is illustrated schematically as 30 in FIG. 1 and includes a hydrocarbon fuel supply or tank 31 and a boron fuel supply or tank 32. As an exemplary interconnection, tank 31 is connected to fuel nozzle 13 through control 36 via conduits 34, 33 for direct hydrocarbon fuel supply to nozzle 13. Hyrocarbon fuel tank 31 is also connected together with boron fuel tank 32 by means of conduits 34 and 35, respectively, to control 36. Control 36 which includes a crossover and blending valve is well known to those skilled in the art and is in need of no particular description for the purposes of this invention. Control 36 is further connected for fuel delivery to manifold 26 and boron fuel nozzles 25 by means of conduit 37.

The flexibility of such an arrangement contributes to various desired combustion processes. For example, hydrocarbon fuel may be introduced through either system, hydrocarbon fuel may be introduced through nozzle 13 and a high energy fuel through boron fuel nozzles 26, or a blend of boron and hydrocarbon fuel may be introduced through either or both sets of nozzles 13 and 26. Various other combinations are contemplated.

The above-described system incorporating high energy boron fuel injection at preferred positions and combined with a conventional hydrocarbon fuel system minimizes solid deposits from the high energy fuel and greatly increases overall performance of jet power apparatus. Solid deposit from boron fuels represents a serious problem to effective utilization of this fuel in a combustion chamber, since solid deposits and clinkers form quite rapidly and proceed not only to coat the combustion chamber, remaining apparatus, guide vanes, and turbine wheels, etc., but also to plug the fuel nozzles rapidly after combustion is initiated to disrupt their performance and thereby contribute to early failure of the apparatus. These deposits, however, are also detrimental on additional surfaces as caused by pyrolysis, i.e., when the boron fuel system is not being used, or after operation thereof. The nozzles or conduits contain some quantities of remaining fuel and portions of these conduits and the nozzles are in a region of relatively high temperatures. Accordingly, these conditions contribute to pyrolysis of the fuel and plugging of the conduits and nozzles. It is quite important in sequential or multiple operation of the boron fuel system to employ some means to prevent pyrolysis after system operation. Various means may be so employed including mechanical apparatus, flushing, etc. A preferred form for this invention is flushing with the hydrocarbon or low energy fuel. Specifically, with the interrelated fuel system it has been found that, upon cessation of the boron fuel system operation, a short period of operation of the boron fuel system on the low energy or hydrocarbon fuel substantially overcomes the problem of pyrolysis by removing the boron fuel from the high temperature regions. Best results are also obtained when the system is preheated by burning the low energy fuel before introduction of the boron-containing fuel.

The teachings of this invention are not limited to combustion chambers of the type illustrated and described but are equally applicable to combustion chambers generally. For example, "afterburner operation" where fuel is injected into the exhaust section of a jet engine for burning therein to increase thrust. Since the exhaust section is relatively large as compared to individual combustion chambers of the main fuel system, the high energy fuel may be introduced generally into the upstream or downstream portion so long as recirculating effects are avoided. Where flame holders are employed, the boron fuel should be introduced downstream thereof to the extent that full burning may take place before loss through the exhaust exit. In the upstream direction, the fuel injection should take place at a position which will permit substantial burning before the flame holder is reached.

The following are examples of the operation of a combustion chamber of this invention and describe the preferred form of operation in relation to variables as before mentioned.

EXAMPLE 1

With the combustion chamber as illustrated in FIG. 1 and with two boron fuel nozzles, as illustrated in FIGS. 2 and 3 at 180° locations, the combustion chamber was operated at an inlet air temperature of between 325 and 330° F., a combustion chamber pressure of 40 inches Hg and an exhaust temperature of 1580° F. The nozzle performance was excellent with no significant deposits. The two nozzles were then replaced with the nozzle modification as illustrated in FIGS. 4 and 5. These nozzles were of a 60° spray angle, ten gallon per hour delivery, and were mounted adjacent the null plane as illustrated in FIG. 1. The system was tested at an inlet air temperature of 360° F., a combustion chamber pressure of 34.9 inches Hg and an exhaust temperature of 1600° F. The results were excellent with respect to combustion characteristics and solid deposit formation.

EXAMPLE 2

A series of tests were performed on the combustion chamber as illustrated in FIG. 1 but with a hydrocarbon and a boron-containing fuel introduced through all nozzles in various ratios. Where equal quantities of fuel were injected into each system, the combustion efficiency appeared to be in excess of 88 percent. This was an extremely high value, since half the fuel was burned in a combustor length about one foot shorter than the normal combustion system. A hot core in the center of the exhaust gas temperature profile was typical since solid fuel is directed towards the center of the combustion chamber.

EXAMPLE 3

In the configuration as illustrated in FIG. 1, two runs were conducted using pentaborane as a test fuel for the boron fuel nozzles. Four nozzles of five gallon per hour capacity were used in the first test, while in the second test, the boron fuel nozzles were replaced by those of a smaller capacity, 2.5 gallons per hour. The starting and operating conditions were as follows: Test I; (1) combustion was initiated using the main hydrocarbon fuel system and ignition was commenced by means of the spark plug 15. After ignition was commenced, electrical energizing of the spark plug was interrupted; (2) the test equipment was brought to an equilibrium temperature with a combustor exhaust gas temperature of 1200° F. (simulated "40,000 foot altitude conditions"); (3) hydrocarbon fuel flow was decreased until exhaust temperature was 1600° F.; (4) pentaborane was injected through nozzles 25 and combustion established; (5) the hydrocarbon fuel was shut off; and (6) after boron fuel operation the system was operated with hydrocarbon fuel as a flushing operation.

As a result of this test, it was found that the pentaborane fuel was ignited and continued to burn uninterrupted when the hydrocarbon fuel was shut off and photographs showed combustion stability to be excellent. The products of combustion deposits were very light on the liner section, a total of 22.5 grams being deposited thereon. No deposits were visible inside or on the tips of the boron fuel nozzles 13 when the combustor was disassembled, and the liner 10 showed no signs of overheating. The following conditions were maintained during the aforementioned Test I.

*Test No. I (5 gal./hr. boron fuel nozzle).*—Air flow in pounds per hour 12,000 fuel air ratio .0087, pressure in inches of mercury absolute 38.8, temperature degrees Fahrenheit 350°, mean temperature 987° F.

*Test No. II (2½ gal./hr. boron fuel nozzle).*—Air flow in pounds per hour 12,000, fuel air ratio .0012, pressure in inches of mercury absolute 38.8, temperature degrees Fahrenheit 350°, mean temperature 1328° F.

For Test II, the ignition procedure was the same as that used in Test I, except that the exhaust gas temperature was 1200° when pentaborane fuel was injected into the chamber. During this test 1.78 pounds of pentaborane fuel were consumed and the following observations made. Pentaborane combustion was stable and continued uninterrupted when the JP4 fuel flow was shut off. Deposits were light on the liner and the nozzle. Total deposits on the liner were about 17.8 grams.

This invention thus provides an effective means of burning boron-containing fuels in a combustion chamber by employing a dual fuel system; i.e., where a single system introduces a hydrocarbon fuel into a combustion chamber and a separate system introduces a boron and/or hydrocarbon fuel adjacent the null plane and downstream of the chamber. The boron fuel nozzles are shrouded in order to minimize solid deposits thereon. This particular combination of an interconnected and interrelated fuel system provides extreme flexibility in the performance of an engine to thereby control the vast cloud-like forms of exhaust material which presents hazards during landing and take-off of aircraft. Further advantages of this interrelated fuel system are derived from the fact that intermittent operation of the boron-containing fuel system with that of the hydrocarbon fuel system results in the hydrocarbon combustion burning off part of the deposits from the boron combustion. Additionally, the invention may be applied to existing jet engines since the dual fuel system preserves present combustion designs.

What we claim as new and desire to secure by Letters Patent of the United States is:

1. The method of burning a higher energy borohydride fluid fuel and a lower energy fuel in a combustion chamber adapted for a flow of air therethrough and having a recirculation zone therein defining an upstream and downstream portion of said chamber which comprises the steps of injecting the lower energy fuel through injection means in the upstream portion of said combustion chamber for combustion thereof, injecting the borohydride fuel through injecting means downstream of said lower energy fuel injection means for the combustion thereof to prevent recirculation of said borohydride fuel and the products of combustion thereof into the upstream portion of said combustion chamber.

2. The method of burning a higher energy borohydride fluid fuel and a hydrocarbon lower energy fluid fuel in a combustion chamber which comprises the steps of providing a fuel air recirculating zone in the said combustion chamber defining an upstream and downstream portion of said combustion chamber with a null zone therebetween, injecting hydrocarbon fuel through injection means in the upstream portion of said combustion chamber from said recirculating zone for combustion thereof, injecting the borohydride fuel through injection means downstream of said hydrocarbon fuel injection means and adjacent said recirculating zone for combustion thereof and to prevent recirculation of said borohydride fuel into the upstream portion of said combustion chamber.

3. The method of burning a higher energy borohydride fluid fuel and a hydrocarbon lower energy fluid fuel in an elongated perforate combustion chamber which comprises the steps of introducing air into said combustion chamber to provide a fuel air recirculating zone in said combustion chamber defining an upstream and downstream portion of said combustion chamber, injecting the hydrocarbon fuel through injection means in the upstream portion of said combustion chamber from said recirculating zone for combustion therefor, injecting the borohydride fuel through injection means downstream of said hydrocarbon fuel injection means and adjacent said recirculating zone for combustion thereof and to prevent recirculation into the upstream portion of said combustion chamber, and flushing said borohydride fuel injection means at the cessation of borohydride fuel injecting therethrough.

4. The method of burning a higher energy borohydride fluid fuel and a hydrocarbon lower energy fluid fuel in an elongated perforate jet engine combustion chamber adapted for the continuous flow of air therethrough which comprises the steps of providing a flow of combustion air through said combustion chamber to include a recirculating zone defined by a flow of air upstream of said combustion chamber and a flow downstream of said combustion chamber and a null zone therebetween, introducing a hydrocarbon fuel into the upstream portion of said combustion chamber, commencing ignition of said hydrocarbon fuel in the upstream portion of said combustion chamber, thereafter introducing borohydride fuel into said combustion chamber by nozzle means downstream of and adjacent said recirculating zone to prevent recirculation of said borohydride fuel into the upstream portion of said combustion chamber withholding further introduction of the borohydride fuel into said combustion chamber, and flushing the borohydride fuel system by injecting low energy hydrocarbon fuel through said borohydride nozzles for ignition thereof.

5. The method of burning a higher energy borohydride fluid fuel and a hydrocarbon lower energy fluid fuel in an elongated perforate jet engine combustion chamber adapted for continuous flow of air therethrough which comprises the steps of providing a flow of combustion air through said combustion chamber to include a recirculating zone defined by a flow of air upstream of said combustion chamber and a flow of air downstream of said combustion chamber with a null zone therebetween, introducing only a hydrocarbon fuel through injection means in the upstream portion of said combustion chamber in the downstream direction, commencing the ignition of the hydrocarbon fuel, thereafter introducing a blend of a hydrocarbon and a borohydride fuel into said combustion chamber adjacent the downstream side of said recirculating zone for ignition thereof, withholding further introduction of the borohydride fuel in said blend, and withholding further introduction of hydrocarbon fuel at the downstream portion of said combustion chamber.

6. In a tubular perforate jet engine combustion chamber having a closed upstream end and an open downstream end and where air entering said perforations in discrete opposing jets provides a null zone near the upstream end which is defined by a flow pattern of air towards the upstream end and a flow pattern of air towards the downstream end, a method of burning a high energy borohydride liquid fuel therein comprising:

(a) injecting a low energy hydrocarbon liquid fuel into said chamber at the upstream end thereof and in the downstream direction, (b) igniting said low energy hydrocarbon fuel in the upstream portion of said chamber for combustion thereof, (c) injecting a high energy borohydride liquid fuel into said chamber by nozzle means next adjacent said null zone in downstream relation thereto for combustion thereof and to prevent recirculation of said borohydride fuel into the upstream portion of said combustion chamber, (d) injecting air into said combustion chamber from around said nozzle means, (e) said injection of borohydride liquid fuel providing a plurality of radially inwardly directed streams of said fuel, (f) injecting low energy hydrocarbon fuel through said high energy borohydride fuel nozzle means, (g) withholding injection of borohydride fuel into said combustion chamber, and (h) continuing combustion in said chamber with low energy hydrocarbon fuel.

7. A dual fuel combustion system for a hydrocarbon lower energy fluid fuel and a higher energy borohydride fluid fuel which comprises in combination, a casing defining a combustion air flow passage, a tubular combustion chamber positioned within said casing to define an annular flow passage therebetween, said chamber including an upstream closed end and a downstream opened end and having a plurality of air admission openings in the wall therebetween, said defined air flow passage and said air openings providing a flow of combustion air in the upstream and downstream direction to define a null plane therebetween, a hydrocarbon fuel nozzle positioned in said closed end for the introduction of fuel longitudinally of said combustion chamber, a plurality of borohydride fuel nozzles positioned in said chamber adjacent the null plane in the downstream direction, said borohydride fuel nozzles being equally circumferentially spaced about said chamber and perpendicular thereto to provide impinging borohydride fuel streams, a shroud on each of said borohydride fuel nozzles for the deflection of combustion air about said nozzles, and an interconnected fuel delivery system for said hydrocarbon fuel nozzle and said borohydride fuel nozzles.

8. The invention as claimed in claim 7 wherein said fuel system includes provision for a schedule of fuel delivery to said combustion chamber which includes separate fuels for separate nozzles, and a blend of both fuels for said borohydride fuel nozzle.

(References on following page)

References Cited in the file of this patent

UNITED STATES PATENTS

| | | |
|---|---|---|
| 2,582,268 | Nerad | Jan. 15, 1952 |
| 2,601,000 | Nerad | June 17, 1952 |
| 2,804,241 | McDowall et al. | Aug. 27, 1957 |
| 2,825,398 | Clarke | Mar. 4, 1958 |
| 2,828,605 | Dobson | Apr. 1, 1958 |
| 2,926,495 | Benson et al. | Mar. 1, 1960 |
| 2,933,894 | Johnson et al. | Apr. 26, 1960 |

FOREIGN PATENTS

| | | |
|---|---|---|
| 765,327 | Great Britain | Jan. 9, 1957 |

OTHER REFERENCES

Leonard: Journal of the American Rocket Society, No. 72, December 1947, pp. 10–21.

Hughes et al.: Industrial and Engineering Chemistry, vol. 48, No. 10, October 1956, pp. 1858–1862.